US012708929B2

(12) United States Patent
Weckend

(10) Patent No.: US 12,708,929 B2
(45) Date of Patent: Aug. 18, 2026

(54) DRIVE MEMBER ASSEMBLY FOR A VIBRATORY SCREEN

(71) Applicant: MIS.CARBONART PTY LTD, Osborne Park (AU)

(72) Inventor: Carsten Weckend, Applecross (AU)

(73) Assignee: MIS.CARBONART PTY LTD, Western Australia (AU)

( * ) Notice: Subject to any disclaimer, the term of this patent is extended or adjusted under 35 U.S.C. 154(b) by 218 days.

(21) Appl. No.: 18/683,878

(22) PCT Filed: Aug. 18, 2022

(86) PCT No.: PCT/AU2022/050923
§ 371 (c)(1),
(2) Date: Feb. 15, 2024

(87) PCT Pub. No.: WO2023/019318
PCT Pub. Date: Feb. 23, 2023

(65) Prior Publication Data

US 2025/0128292 A1 Apr. 24, 2025

(30) Foreign Application Priority Data

Aug. 18, 2021 (AU) ................................ 2021902578

(51) Int. Cl.
*B07B 1/42* (2006.01)
*B07B 1/28* (2006.01)
*B07B 1/46* (2006.01)

(52) U.S. Cl.
CPC .................. *B07B 1/42* (2013.01); *B07B 1/28* (2013.01); *B07B 1/46* (2013.01)

(58) Field of Classification Search
CPC ................ B07B 1/28; B07B 1/42; B07B 1/46
(Continued)

(56) References Cited

U.S. PATENT DOCUMENTS 1,725,511 A * 8/1929 Flanagan ................ B07B 1/343 209/403
4,180,458 A * 12/1979 Shahan .................. B07B 1/284 248/560
(Continued)

FOREIGN PATENT DOCUMENTS

CL 202400488 6/2024
CL 202400489 6/2024
(Continued)

OTHER PUBLICATIONS

Chilean Office Action and Search Report dated Apr. 8, 2025 for Chilean Patent Application No. 202400490.
(Continued)

*Primary Examiner* — Terrell H Matthews
(74) *Attorney, Agent, or Firm* — Greer, Burns & Crain, Ltd.

(57) ABSTRACT

The invention provides a drive member assembly (130) for a vibratory screen (100) having a frame (110), comprising drive members or beams (400) having opposed ends (410, 420) for engaging the frame. There is an opening (480), preferably curved, at or adjacent at least one of the opposed ends (410, 420) for relieving stress on each drive member (400). A vibratory screen (100) incorporating the drive member assembly (130) is also provided.

19 Claims, 11 Drawing Sheets

(58) Field of Classification Search
USPC ........................................................ 209/364
See application file for complete search history.

(56) References Cited

U.S. PATENT DOCUMENTS

| | | | | |
|---|---|---|---|---|
| 4,840,728 | A * | 6/1989 | Connolly .................. | B07B 1/46<br>209/397 |
| 5,199,574 | A * | 4/1993 | Hollyfield, Jr. ........... | B07B 1/42<br>209/315 |
| 10,046,364 | B2 | 8/2018 | Ashley et al. | |
| 10,123,486 | B2 * | 11/2018 | Reinecke .............. | A01F 12/446 |
| 2009/0206011 | A1 | 8/2009 | Cudahy | |

FOREIGN PATENT DOCUMENTS

| | | | |
|---|---|---|---|
| CN | 202845314 | U | 4/2013 |
| CN | 212093167 | U * | 12/2020 |
| KR | 20140140210 | A | 12/2014 |
| WO | WO2023019315 | A1 | 2/2023 |
| WO | WO2023109316 | A1 | 2/2023 |

OTHER PUBLICATIONS

Chinese Office Action dated Dec. 3, 2025 for Chinese Patent Application No. 202280061992.1.

* cited by examiner

DRIVE MEMBER ASSEMBLY FOR A VIBRATORY SCREEN

CROSS-REFERENCE TO RELATED APPLICATIONS

This application is the U.S. National phase application corresponding to PCT/AU2022/050923 which was assigned an international filing date of Aug. 18, 2022 and associated with publication WO 2023/019318 A1 and which claims priority to Australian Application No. 2021902578, filed Aug. 18, 2021, the disclosures of which are expressly incorporated herein by reference.

FIELD OF THE INVENTION

The invention relates to a drive member assembly and in a particular to a drive shaft or beam for the drive member assembly. The invention has been developed primarily for use as in a drive member assembly for a vibratory screen in the separation of mineral ore and will be described hereinafter by reference to this application. However, it will be appreciated that the invention is not limited to this particular field of use, but also extends to other types of structures that require attenuation of stress.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Vibratory screens are frequently used in the mining and mineral processing industries for separating ores of different particle sizes. Vibratory screens can be used in variety of applications. For example, in the separation of dry particles, such as iron ore. In another example, vibratory screens are used in the separation of wet particles from dry particles, such as that used in spodumene separation (spodumene being the hard rock precursor to lithium hydroxide or lithium carbonate).

A typical vibratory screen comprises a frame mounted on springs with a screen or deck fitted to the frame and a drive mechanism to induce vibrations in the frame (and hence, the screen). Generally, vibratory screens are either designated as inclined or horizontal, referring to the type of motion used. A horizontal vibratory screen uses a reciprocating or back and forth motion to induce vibrations, whereas an inclined vibratory screen uses a circular motion to induce vibrations. The drive mechanism has a motor operably connected to a drive member assembly having one or more drive members, beams or shafts mounted to the frame. The motor induces movement to the drive beam(s), which is transmitted to the frame and generates vibrations. The drive beam(s) may have eccentric weights to assist in generating vibrations. In operation, mineral ore having a variety of particle sizes is loaded onto the screen or deck. Vibrations are generated by the drive mechanism and transmitted to the frame and screen, causing the ore particles to be classified according to the size of the holes in the screen.

The main deficiencies in current vibratory screens revolve around longevity, especially when the vibratory screen is used as solid separation screens in a liquid separation/dewatering process, which has an increased tendency to create pitting and corrosion. Conventional vibratory screens are made entirely of a mixture of steel, stainless steel and polyurethane, depending on the component. As such, conventional vibratory screens tend to break easily, be damaged by impact strikes from moving ore particles, corrode, bend, rust or otherwise degrade, especially when the ore material is corrosive and/or abrasive or the liquid operating environment promotes corrosion or rust in the vibratory screen components. This results in conventional vibratory screens requiring frequent refurbishment or replacement. For example, refurbishment may be required every 6 to 8 months when used in a dewatering/wet process. Refurbishment typically costs around AUD100,000. Hence, the need for constant refurbishment due to corrosion and fatigue imposes a significant capital, operational and maintenance burden.

In particular, the drive beam or shaft is under a significant amount of stress as it is the component of the vibratory screen directly attached to the motor that provides agitation to induce vibrations in the system. Consequently, the drive beam or shaft carries a very high fatigue risk and is the component of a vibratory screen that most frequently requires replacement.

It is an object of the present invention to overcome or substantially ameliorate one or more of the disadvantages of prior art, or at least to provide a useful alternative. It is an object of the invention in at least one preferred form to provide an improved or useful drive member for a vibratory screen that is more resistant to fatigue and thus requires less frequent replacement.

SUMMARY OF THE INVENTION

A first aspect of the invention provides a drive member assembly for a vibratory screen having a frame, comprising:

at least one drive member having opposed ends for engaging the frame; and an opening at or adjacent at least one of the opposed ends for relieving stress on the at least one drive member.

In one embodiment, the opening is adapted or configured for relieving stress on the at least one drive member.

In some embodiments, the opening is substantially arcuate or substantially curved in shape. In one preferred embodiment, the opening is partly circular or substantially circular in shape. In other embodiments, the opening comprises a cut-out section or slot of the at least one drive member. The slot may be open or closed. In further embodiments, the opening has a width relative to a longitudinal axis of the at least one drive member, the opening width being equal to or greater than its length. Alternatively, the opening width is less than its length.

In some embodiments, the opening is formed substantially at or adjacent an edge of the at least one drive member. In further embodiments, a portion of the at least one drive member at the edge tapers substantially inwardly to define the opening. In yet other embodiments, the portion defines a substantially curved, partly curved, circular or partly circular opening.

In some embodiments, the opening is formed within the body of the at least one drive member. In other embodiments, the opening comprises a hole or aperture. In other embodiments, a plurality of openings is formed within the body of the at least one drive member.

In some embodiments, there are two of the openings, such that one opening is located at or adjacent at each opposed end. In other embodiments, a plurality of openings is formed within the body of the at least one drive member.

In some embodiments, the at least one drive member has a mounting element at each opposed end to mount the at least one drive member to the frame. In other embodiments, the mounting element comprises a mounting plate. In other embodiments, the at least one drive member is formed integrally at each opposed end to the frame. In further embodiments, the at least one drive member has a mounting element extending substantially along a longitudinal opposing edge to mount the at least one drive member to the frame. In other embodiments, the at least one drive member has a mounting element extending substantially along each longitudinal opposing edge to mount the at least one drive member to the frame.

In some embodiments, the at least one drive member comprises at least one mounting surface for receiving a drive mechanism.

In some embodiments, the drive member assembly comprises two or more drive members arranged parallel to each other, wherein the opening is provided in each drive member. In other embodiments, the opening is provided at or adjacent each opposed end of each drive member, such that there are two of the openings for each drive member. In one embodiment, the drive members are connected at their respective opposed ends to a common mounting element. In other embodiments, the drive members are substantially spaced apart to create a void, gap or slot between the drive members, the void, gap or slot substantially connecting the respective openings of the drive members. In further embodiments, the drive members are arranged so that the openings are substantially in alignment with each other. In yet another embodiment, the drive members are arranged so that the openings are substantially facing or opposite each other.

In some embodiments, the drive member assembly comprises a single drive member. In other embodiments, there are two of the openings in the single drive member located at or adjacent each opposed end. In further embodiments, the single drive member comprises a void, gap or slot substantially joining the openings.

A second aspect of the invention provides a vibratory screen comprising:

- a frame having side panels;
- at least one screen deck connected to the frame; and
- a drive member assembly according to the first aspect of the invention mounted to the side panels.

This second aspect of the present invention may have the features of the embodiments of the first aspect above.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
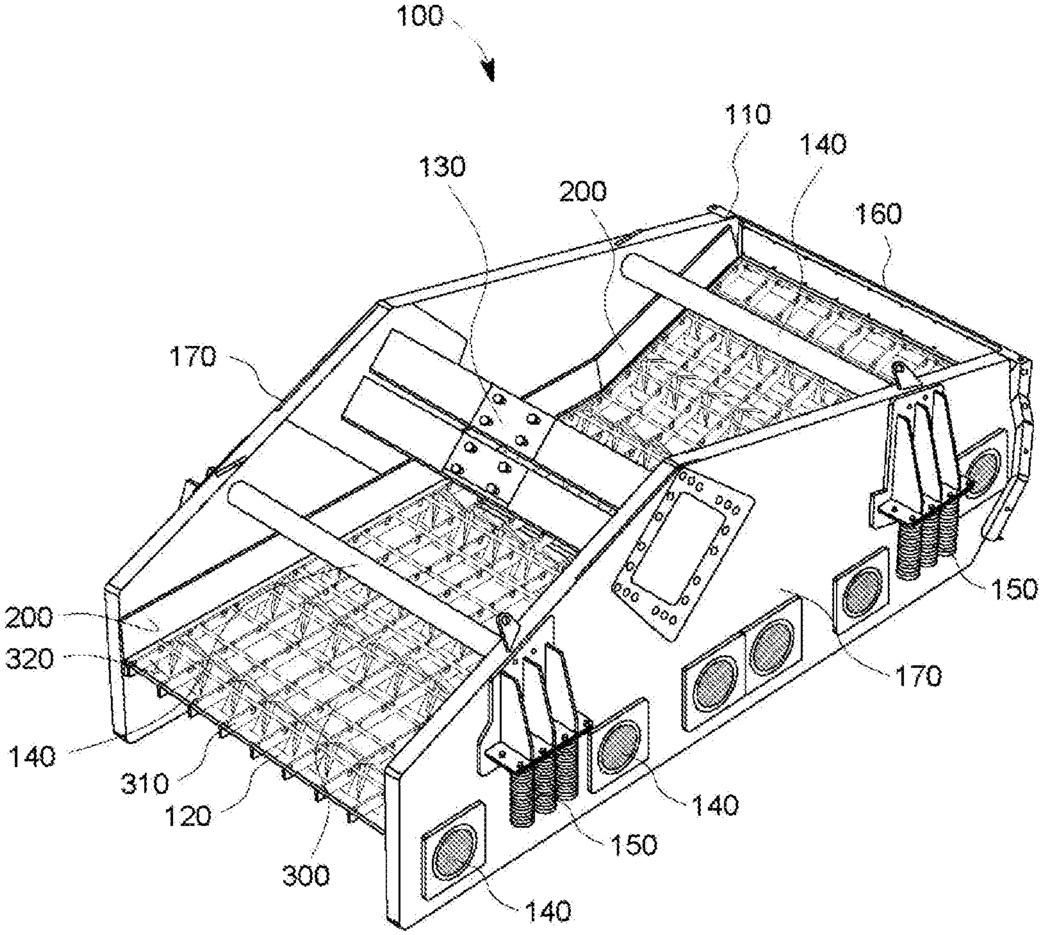
FIGS. 1 and 2 are perspective views of a vibratory screen with a drive member assembly according to an embodiment of the invention.

The present invention will now be described with reference to the following examples which should be considered in all respects as illustrative and non-restrictive. In the Figures, corresponding features within the same embodiment or common to different embodiments have been given the same reference numerals.

Figure 2:
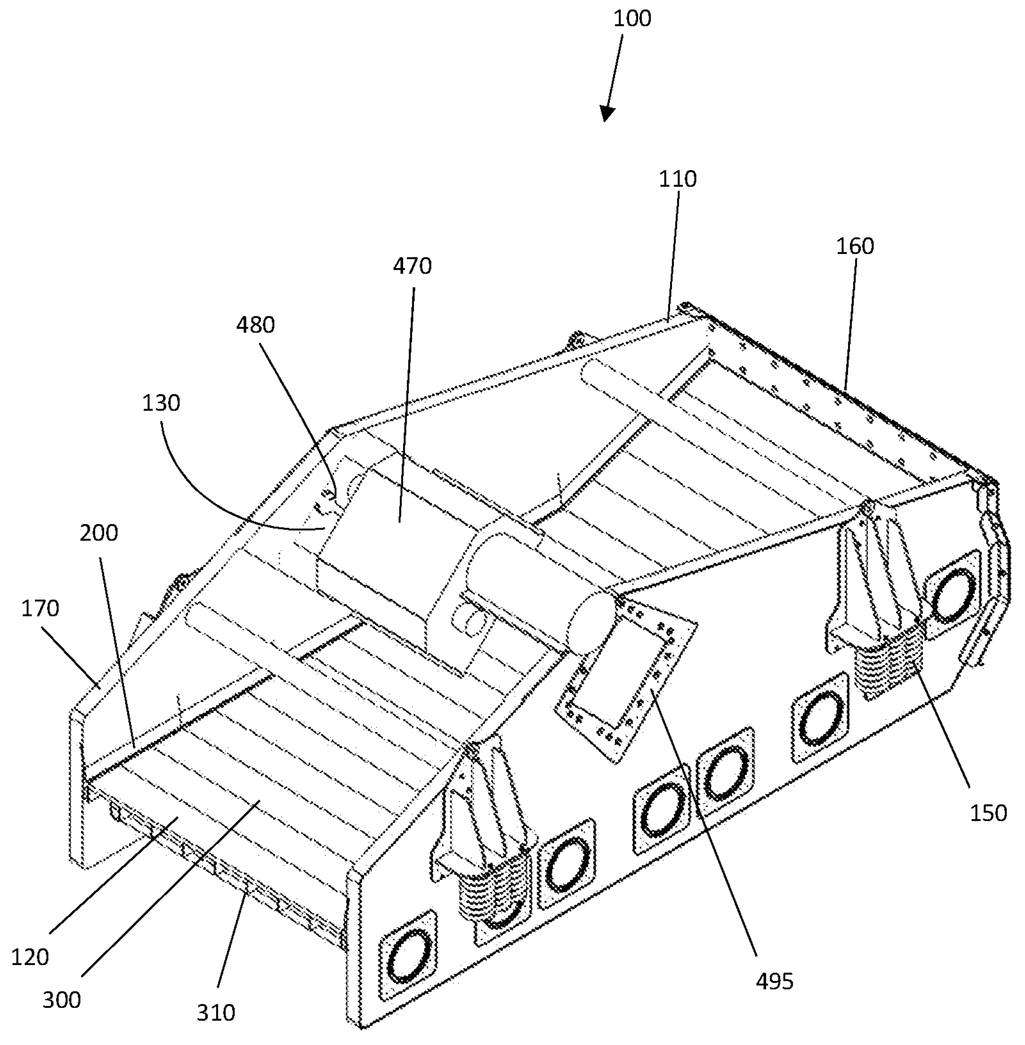

Referring to FIGS. 1 and 2, a vibratory screen 100 has a frame 110, a screen deck 120, a drive member assembly 130, supporting cross beams 140 and springs 150. The frame 110 has a back or rear panel 160 and two side panels 170. The screen deck 120 is connected to the rear panel 160 and side panels 170 of the frame 110.

The side panels 170 each have several protective plates 200 for protecting the side panels from damage and/or corrosion caused by the ore material being classified by the vibratory screen 100. The screen deck 120 comprises a screen surface 300 having apertures or openings configured for permitting mineral ore particles having a diameter less than or equal to a certain specified size to pass through, while preventing mineral ore particles having a diameter greater than the specified size to pass through. The screen deck 300 supported by a plurality of rails 310 and the cross beams 140, as best shown in FIGS. 1 and 2. The screen deck is secured to the rails 310 and protective plates 200 by rods or pins (not shown) that fit into collars (not shown) formed on the rails.

Referring to FIGS. 3 to 11, the drive member assembly 130 according to one embodiment of the invention has two drive beams or shafts 400 spaced apart and parallel to each other to form a void or gap 405 running along most of their respective lengths. The drive beams 400 are connected at their respective ends 410, 420 to mounting plates 450 for mounting to the side panels 170 of the frame 110. The drive beams 400 are formed from I-beams (i.e. two parallel flanges or sheets connected at their longitudinal axes by a perpendicular sheet to form an I-shape) that are connected to each other (generally, by welding) at their respective ends 410, 420. Alternatively, the I-beams may be cast as a single member. Mounting surfaces 460 are provided in the middle of the drive beams 400 with mounting holes 462 for receiving a drive mechanism 470 (as best shown in FIG. 2), such as a motor or exciter, to transmit motion to the drive beams, which then induce vibrations in the frame 110 and screen deck 120.

Figure 3:
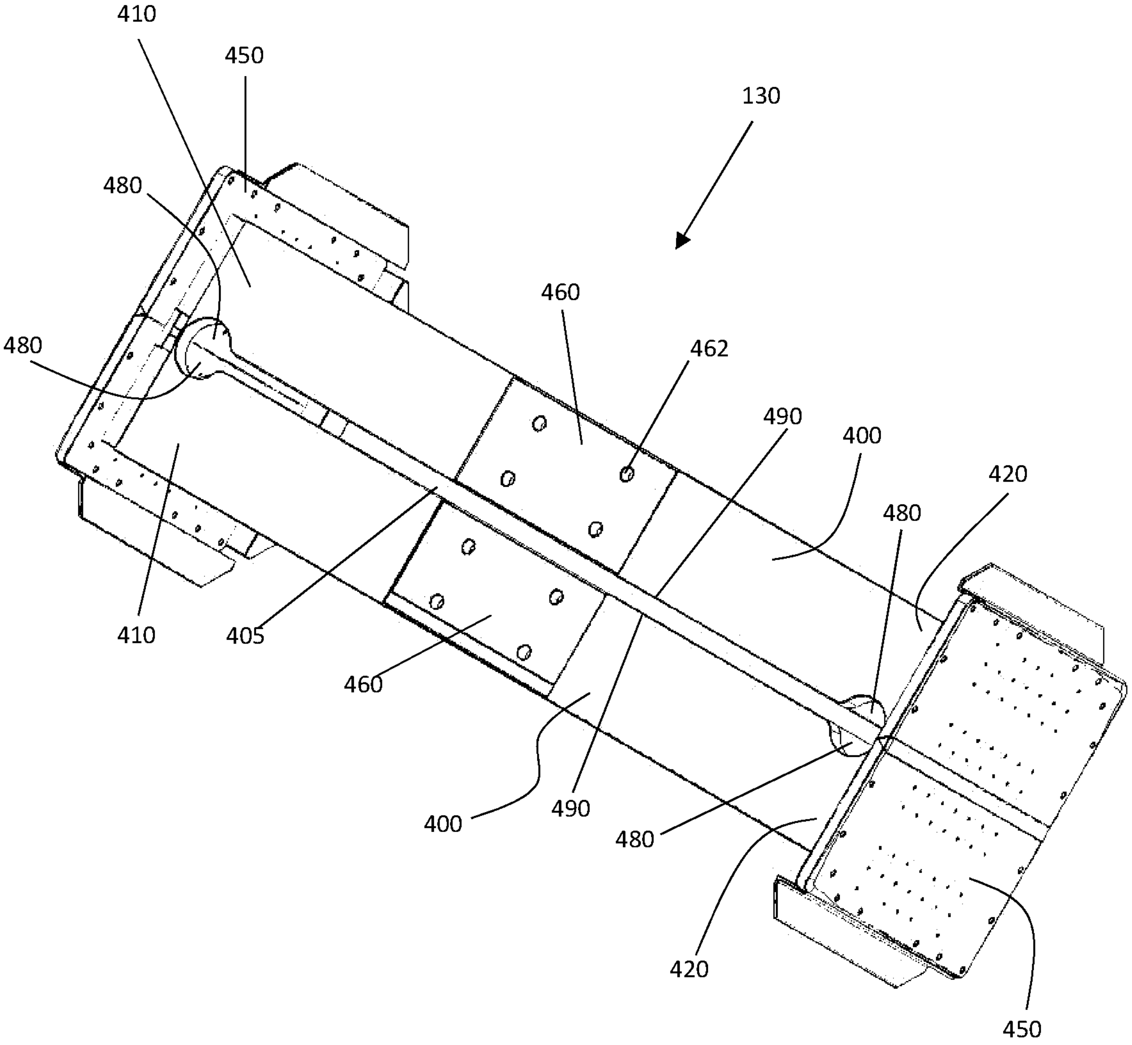
FIG. 3 is a perspective view of the drive member assembly shown in FIG. 1.
Figure 4:
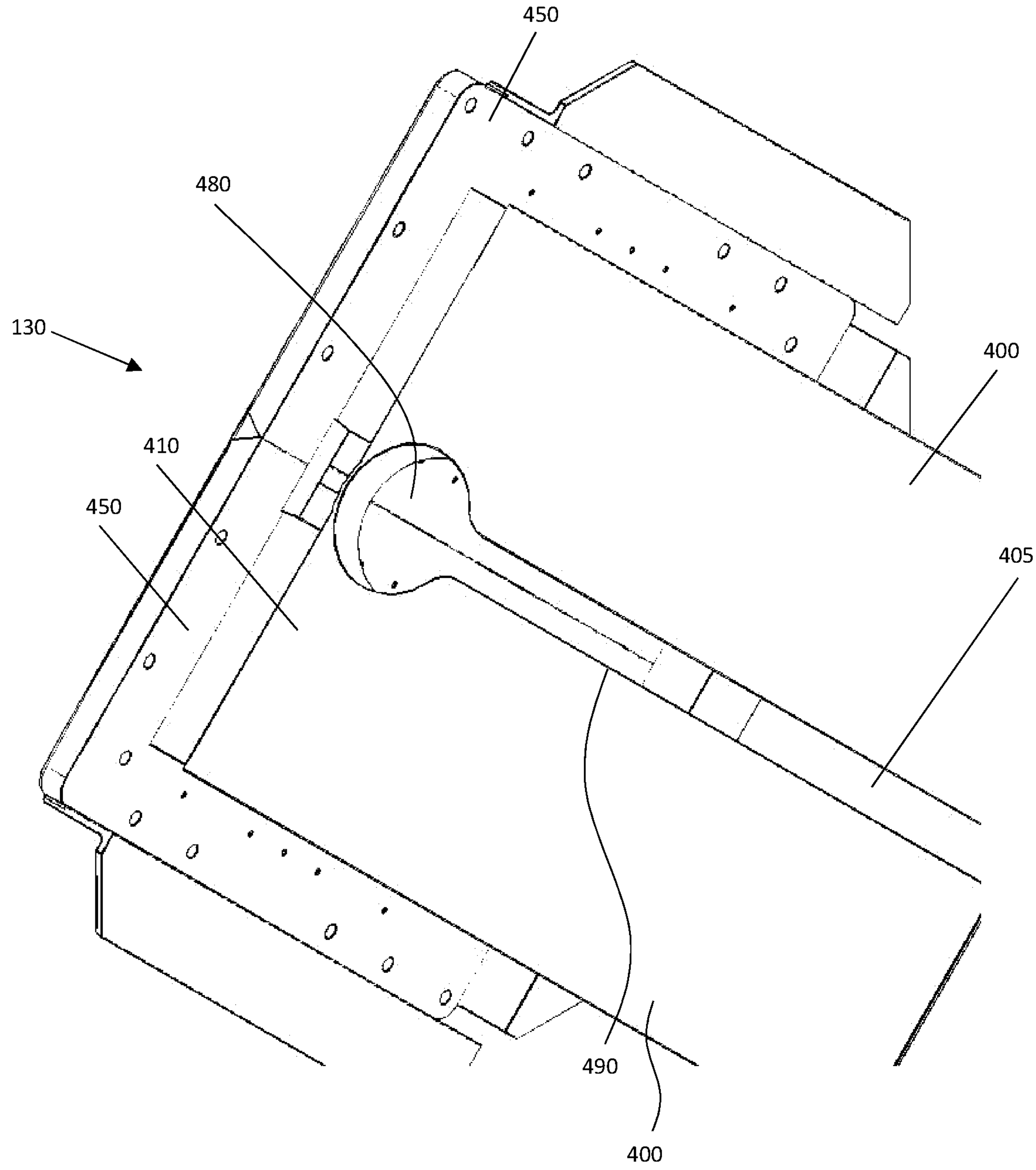
FIG. 4 is a partial close up perspective view of the drive member assembly shown in FIG. 3.

The drive beams 400 further have an opening in the form of a cut-out section or opening 480 that is curved or circular in shape, as best shown in FIGS. 3 and 4. The cut-out sections or openings 480 are formed along an inner edge 490 of each drive beam 400 adjacent each of the opposed ends 410, 420 and recessed into the body of the drive beam 400. The openings 480 are joined via the longitudinal gap 405 extending between the drive beams 400.

Figure 9:
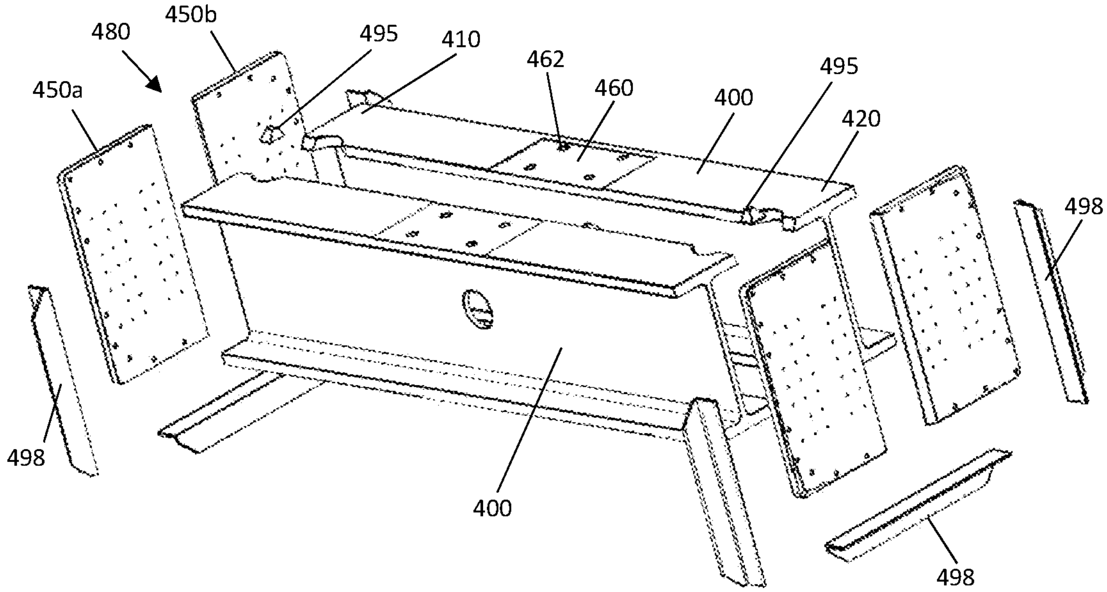
FIG. 9 is an exploded view of the drive member assembly shown in FIG. 3.
Figure 10:
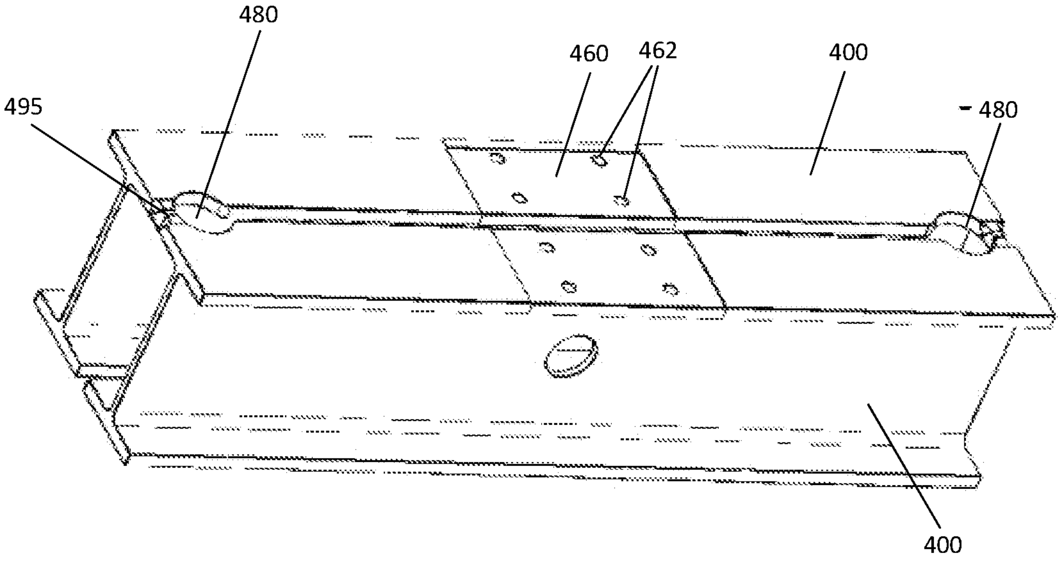
FIG. 10 is another perspective view of the drive member assembly of FIG. 3.

Referring to FIGS. 9 and 10, construction of the drive member assembly 130 is shown in more detail. Each drive beam 400 is formed from an I-beam and are welded together at their respective ends 410, 420 to mounting plates 450. A wedge shaped bridge or connecting portion 495 also connects the I-beam drive beams 400 adjacent their respective ends 410, 420 and curved openings 480. The mounting plates 450 comprise separate mounting plate portions 450*a*, 450*b* welded together and to side mounting flanges 498. While the separate components of the drive beam assembly 130 are joined by welding, other types of connections may be used. Also, the mounting plates 450 could be cast as a single piece instead of being assembled from separate components. Moreover, other components of the drive member assembly 130, or even the entire drive member assembly, could be integrally formed as a single piece, such as by casting.

Figure 14:
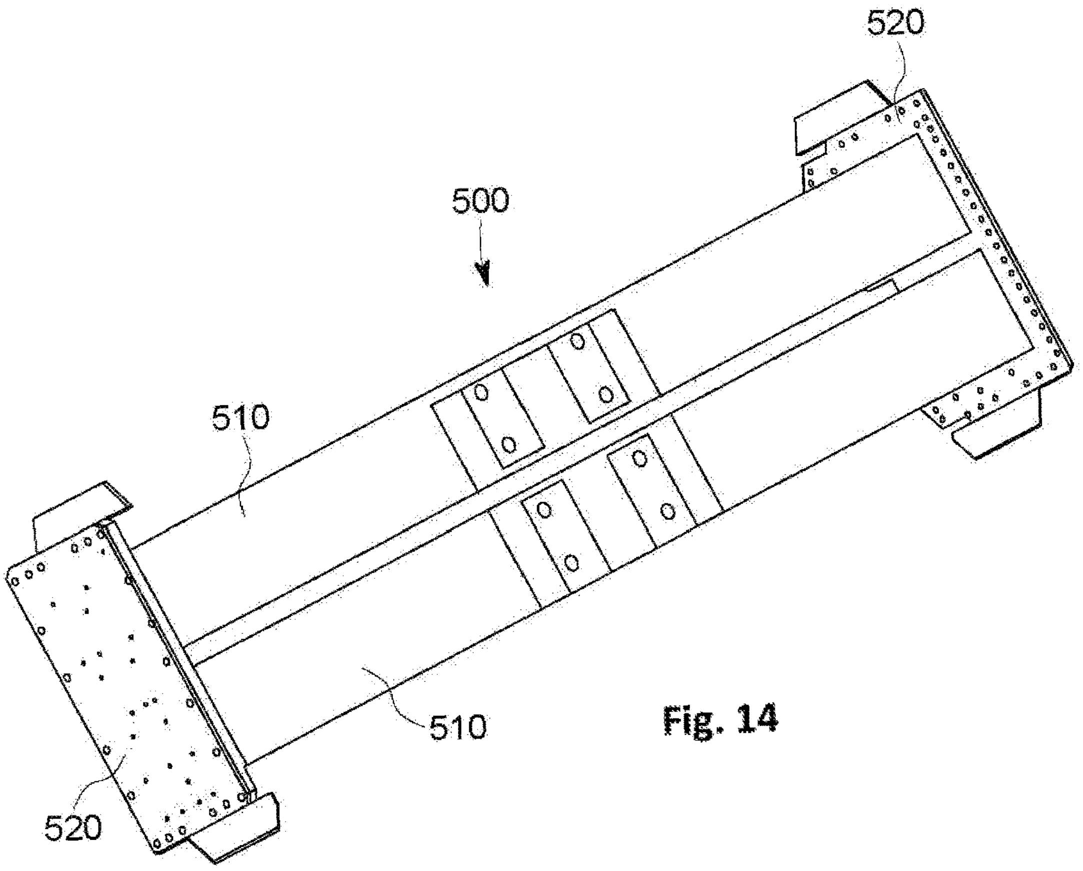
FIG. 14 is a perspective view of a conventional drive member assembly.

The cut-out sections or openings 480 are configured to relieve stress on the drive beams 400 and thus minimise the amount of fatigue placed on the drive beams during operation of the vibratory screen 100. The arcuate or curved profile of the cut-out sections or openings 480 evenly distribute stress forces applied to the drive beam 400, reducing stress concentrations that are likely to increase fatigue and lead to breakage. This stands in contrast to a conventional drive member assembly 500, as best shown in FIG. 14. The conventional drive member assembly 500 has two I-beam members 510 connected to mounting plates 520. It has been discovered that this conventional structure leads to concentrations of stress in the I-beam members 510, increasing the amount of fatigue and thus increasing the risk of breakage or damage.

Figure 11:
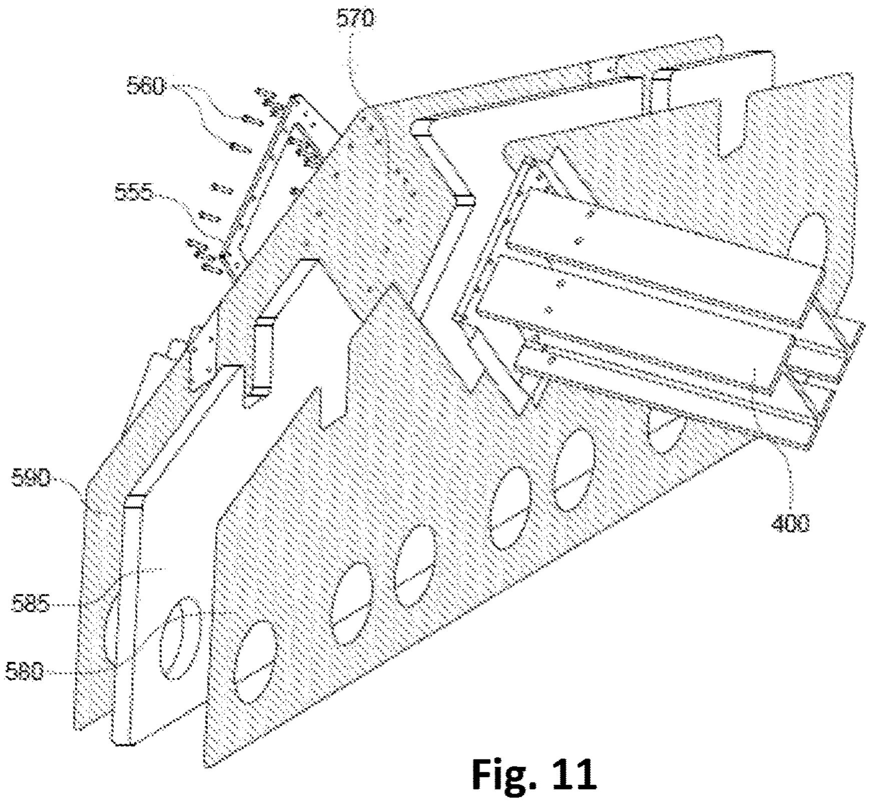
FIG. 11 is a partial exploded perspective view of the drive member assembly shown in FIG. 3 and side panel of vibratory screen of FIG. 1.
Figure 12:
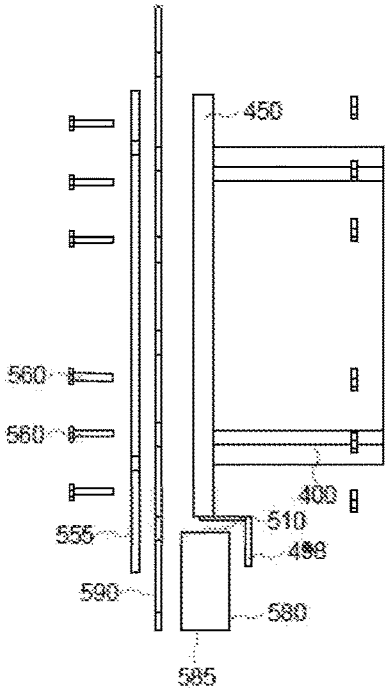
FIG. 12 is a partial exploded cross-sectional view of the connection between the drive member assembly and attachment plates for mounting the drive member assembly to the vibratory screen shown in FIG. 11.
Figure 13:
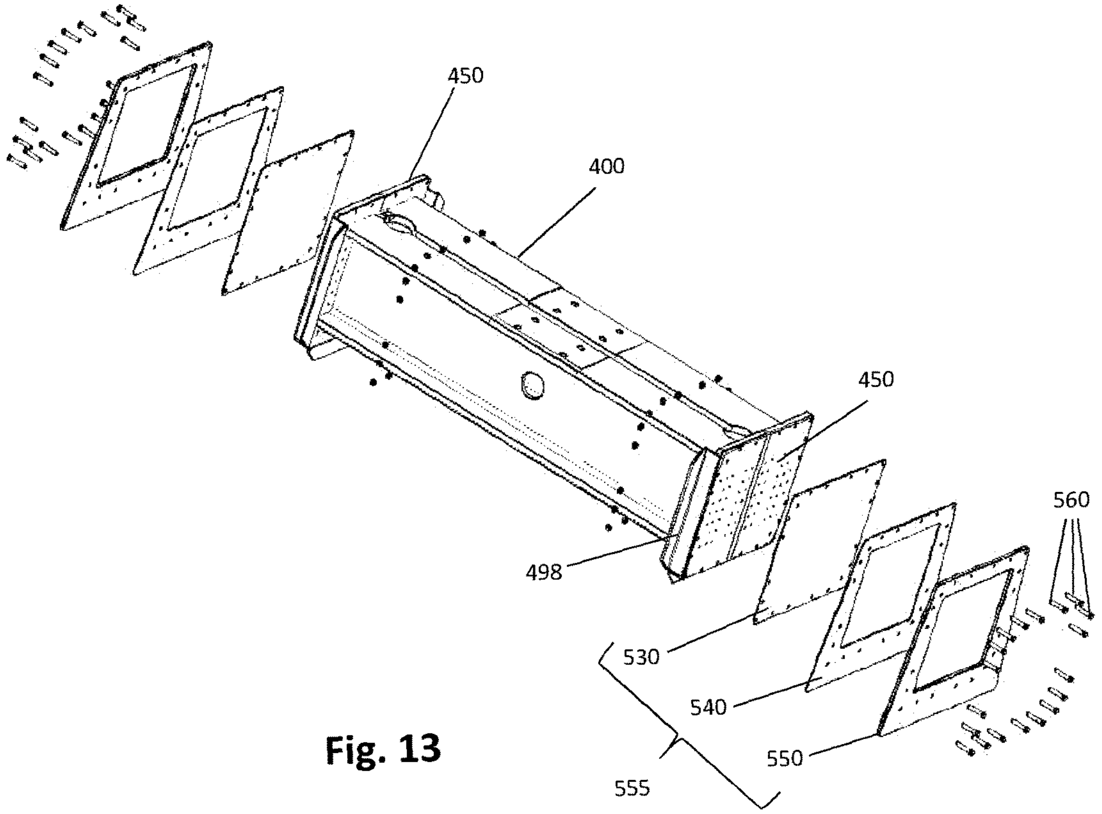
FIG. 13 is a partial exploded view of the drive member assembly and the attachment plates of FIG. 12.

Referring to FIGS. 11 to 13, the drive beam assembly 130 is mounted to the side panels 170 of the vibratory screen 100 using a series of attachment plates 530, 540, 550 that form an attachment plate assembly 555 and fasteners in the form of bolts 560. As shown in FIGS. 11 and 12, the mounting plate 450 fits into a cavity 570 formed in an inner carbon fibre layer 580 and foam core layer 585 of the side panel 170 to directly engage an outer carbon fibre layer 590 of the side panel 170. The side mounting flanges 498 engage the edges of the cavity 570 and part of the surface of the inner carbon fibre layer 550. The attachments plates 530, 540, 550 are then assembled into the attachment plate assembly 555, which is connected to the outer carbon fibre layer 550 and mounting plate 450 via the bolts 560, as best shown in FIG. 12. In this manner, the drive beam assembly 130 is mounted to the side panels 170 but only directly contacts the carbon fibre or foam core layers of the side panels and not the steel attachment plates 530, 540, 550 of the attachment plate assembly 555. This connection arrangement minimises direct steel to steel contact of the attachment plates 530, 540, 550 with the mounting plate 450, reducing or eliminating the risk of galvanic corrosion caused by steel to steel contact of these components, thus increasing the longevity of the drive beam assembly 130.

Figure 5:
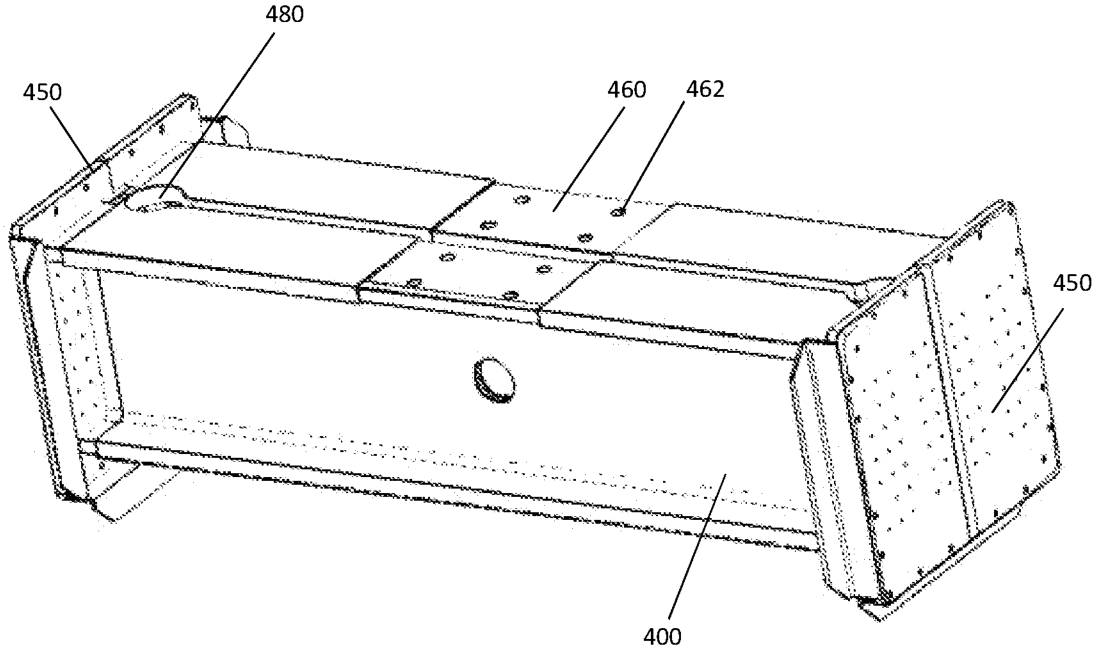
FIG. 5 is a front perspective view of the drive member assembly shown in FIG. 3.
Figure 6:
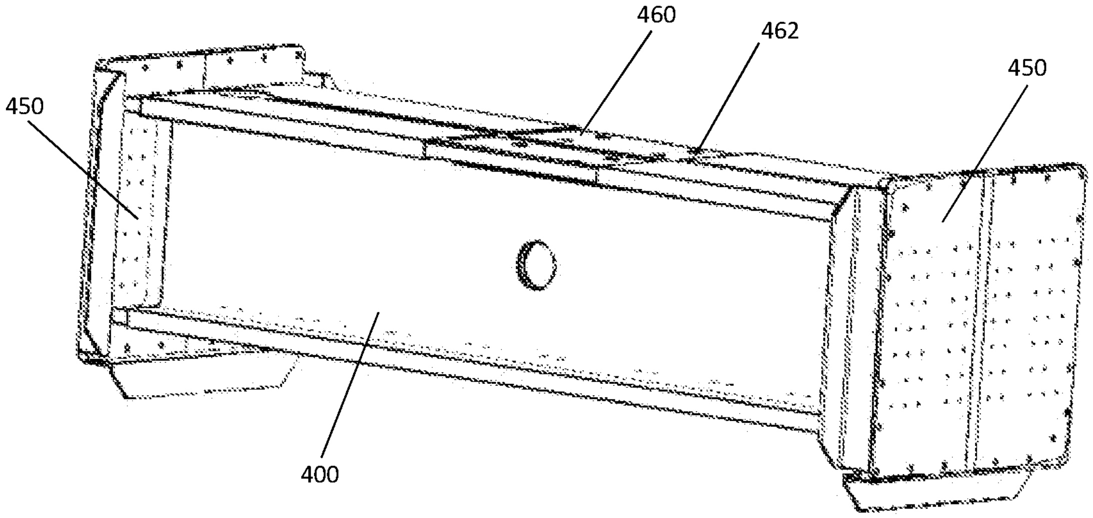
FIG. 6 is a side perspective view of the drive member assembly shown in FIG. 3.
Figure 7:
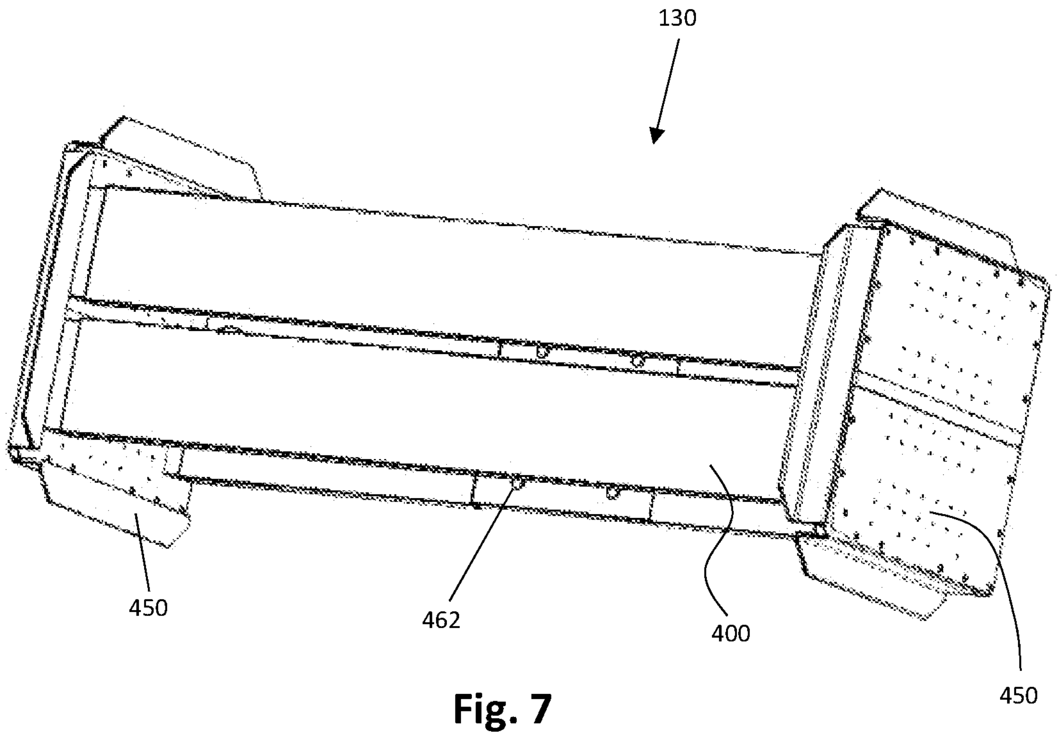
FIG. 7 is a rear perspective view of the drive member assembly shown in FIG. 3.
Figure 8:
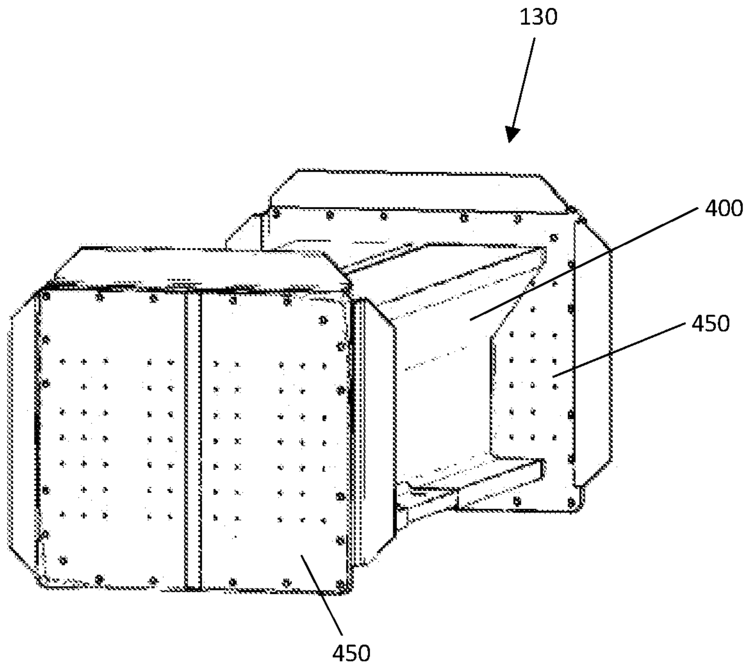
FIG. 8 is an end perspective view of the drive member assembly shown in FIG. 3.
Figure 15:
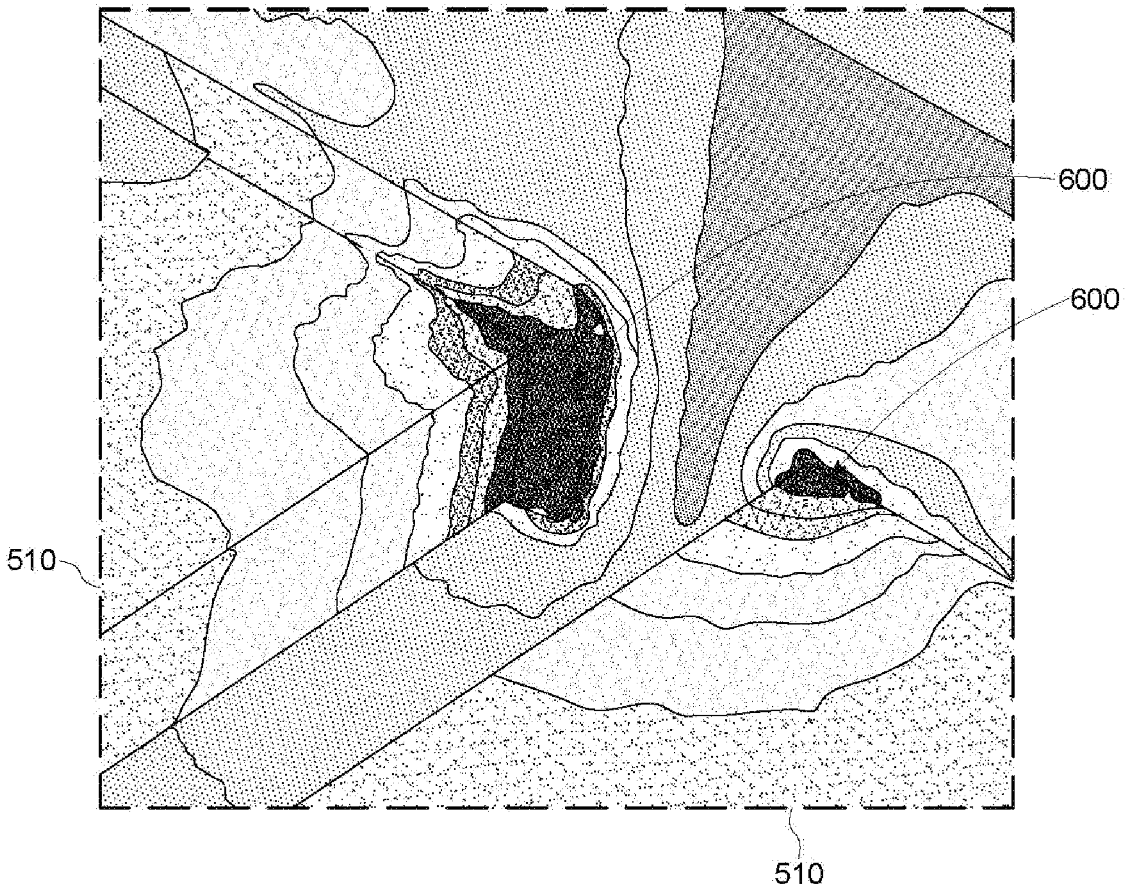
FIG. 15 is a finite element analysis map illustrating the stress distribution across the conventional drive member assembly of FIG. 14 when in use.
Figure 16:
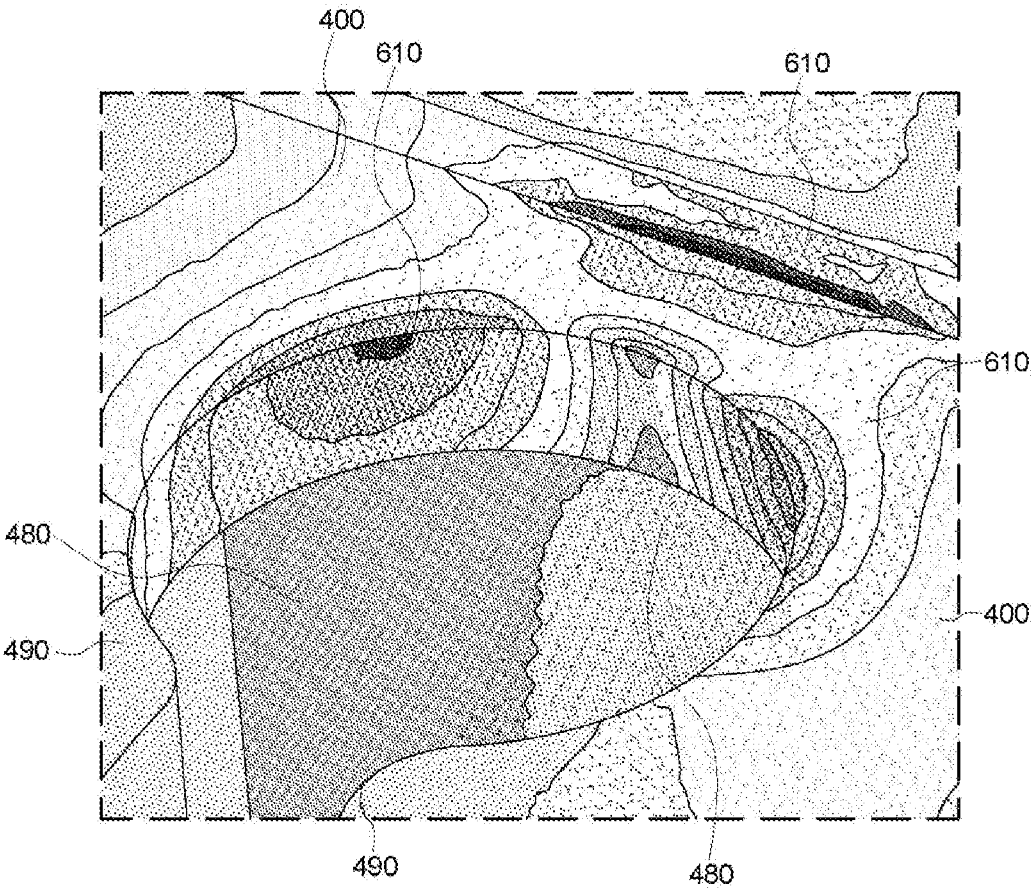
FIG. 16 is a finite element analysis map illustrating the stress distribution across the drive member assembly of FIGS. 3 to 13 when in use.

Referring to FIGS. 15 and 16, a finite element analysis was conducted in respect of the conventional drive member assembly 500 and the drive member assembly 130 to produce finite element analysis maps for each drive beam assembly. In each finite element analysis map, areas of relative stress in a structure are indicated by colours ranging from blue (little or no stress), green (low stress), yellow (moderate stress), yellow orange (high stress) and red (very high stress). As shown in FIG. 4, the conventional drive member assembly 500 has highly concentrated areas of very high stress at the inner corners of the I-beam members 510, as indicated by arrow 600, ranging from 56 MPa 90 MPa. This very high stress is concentrated in a small area, increasing the fatigue on the drive member 510, rendering it more likely to break or fail during operation of the vibratory screen and require replacement. In contrast, the finite element analysis map for the drive member assembly 130 as shown in FIG. 5 illustrates that the amount of stress on the drive beams 400 is considerably less, with no red areas of very high stress and only small orange areas of high stress, as indicated by arrow 610, spread around the cut-out section or opening 480, as indicated by arrow 610, ranging from 32 MPa to 37 MPa. The finite element analysis maps demonstrate that the use of the cut-out sections or openings 480 considerably reduces the amount of stress and the concentration of that stress on the drive beams 400 in the drive member assembly 130. Consequently, there is less fatigue on the drive beams 400, thereby minimising or reducing the risk of failure or breakage during operation of the vibratory screen 100. This in turn reduces the frequency of replacement and the amount of downtime for the vibratory screen 100.

While the preferred embodiment has been described as having a circular cut-out section or opening, it will be appreciated that in other embodiments, the opening may have a different configuration. For example, the opening may be oval, parabolic or other curved shape. In another example, the opening may be partly oval, parabolic or otherwise curved. In yet other examples, the opening may have a hexagonal, octagonal, decagonal, dodecagonal, as well as partly hexagonal, octagonal, decagonal, dodecagonal, or other similar polygonal or partly polygonal shapes. Other embodiments will use openings composed of a combination of shapes, such as partly oval and partly parabolic.

Similarly, while the drive member assembly 130 has been described as having two drive members joined together, in other embodiments, there may a single drive member having the same shape and configuration of the two drive members. That is, a single drive member having two portions joined at their respective ends but spaced apart and arranged in parallel to create the longitudinal gap 405 with a pair of openings 480 at either end. In this case, the single drive member is cast as a single piece. In a further alternative, the drive member assembly 130 may be formed by more than two drive members 400, where required.

In addition, the bridge portion 495 may have shapes other than its wedge shape, which has been chosen to complement the curvature of the openings 480 on each drive beam 400. Consequently, the bridge portion 495 make take other shapes to complement the shape of the openings 480 on the drive members 400. Alternatively, the bridge portion 495 could be integrated with one of the drive beams 400, rather than being formed as a separate component.

In some embodiments, the mounting surfaces 460 are formed by separate plates, unlike the illustrated embodiment where the mounting surfaces are formed by machining the drive members 400 to create the outline and holes 462 for mounting the exciter 470.

It will further be appreciated that features in the preferred embodiment of the invention may be omitted or modified without affecting the operation of the described embodiment. For example, the drive member assembly 130 need not have a longitudinal gap 405 between the drive beams 400 or within the single drive member. Similar omissions or modifications to the features from the described embodiment of the invention can be readily made by one skilled in the art.

It can thus be seen the invention provides a drive member assembly that is more resistant to fatigue, increasing its longevity and reducing the frequency of replacement. This results in increased longevity of the vibratory screen and reduces maintenance burdens by saving labour and reducing downtime for replacement of the drive members. Moreover, the drive member assembly is connected to the vibratory screen to minimise corrosion of the drive member assembly. Furthermore, the drive member assembly of the invention can be readily implemented to existing vibratory screens. In all these respects, the invention represents a practical and commercially significant improvement over the prior art. Also, while the invention has been described with reference to specific examples, it will be appreciated by those skilled in the art that the invention may be embodied in many other forms.

The invention claimed is:

1. A drive member assembly for a vibratory screen having a frame, comprising:

at least one drive member having opposed ends for engaging the frame; and an opening for relieving stress on the at least one drive member, said opening being located at or adjacent to at least one of the opposed ends, wherein the opening comprises a cut-out section of the at least one drive member.

2. The drive member assembly of claim 1, wherein the opening is arcuate or curved in shape.

3. The drive member assembly of claim 1, wherein the opening is partly circular or circular in shape.

4. The drive member assembly of claim 1, wherein the opening has a width relative to a longitudinal axis of the at least one drive member, the opening width being equal to or greater than its length.

5. The drive member assembly of claim 1, wherein the opening has a width relative to a longitudinal axis of the at least one drive member, the opening width being less than its length.

6. The drive member assembly of claim 1, wherein the opening is formed at or adjacent to an edge of the at least one drive member.

7. The drive member assembly of claim 6, wherein a portion of the at least one drive member at the edge tapers inwardly to define the opening.

8. The drive member assembly of claim 1, wherein the opening is formed within the body of the at least one drive member.

9. The drive member assembly of claim 1, wherein the at least one drive member has a mounting element at each opposed end to mount the at least one drive member to the frame.

10. The drive member assembly of claim 1, wherein the at least one drive member comprises at least one mounting surface for receiving a drive mechanism.

11. The drive member assembly of claim 1, wherein there are two of the openings, such that one opening is located at or adjacent to at each opposed end.

12. The drive member assembly of claim 1, wherein the drive member assembly comprises two or more drive members arranged parallel to each other and wherein the opening is provided in each drive member.

13. The drive member assembly of claim 12, wherein the drive members are spaced apart to create a void, gap or slot between the drive members, the void, gap or slot connecting the respective openings of the drive members.

14. The drive member assembly of claim 12, wherein the drive members are arranged so that the openings are in alignment with, facing or opposite each other.

15. The drive member assembly of claim 12, wherein the opening is provided at or adjacent to each opposed end of each drive member, such that there are two of the openings for each drive member.

16. The drive member assembly of claim 1, wherein the drive member assembly comprises a single drive member.

17. The drive member assembly of claim 16, wherein there are two of the openings in the single drive member located at or adjacent to each opposed end.

18. The drive member assembly of claim 17, wherein the single drive member comprises a void, gap or slot joining the openings.

19. A vibratory screen comprising: a frame having side panels;

at least one screen deck connected to the frame; and the drive member assembly according to claim 1 mounted to the side panels.

* * * * *